No. 720,479. PATENTED FEB. 10, 1903.
W. W. PRICE.
COVER FOR CENTRIFUGAL CLARIFIERS.
APPLICATION FILED APR. 23, 1902.
NO MODEL.

Witnesses
B. J. Colbourne
J. Ed. Webster

Inventor
Wm. W. Price
by Ridout & Maybee
Attys

UNITED STATES PATENT OFFICE.

WILLIAM W. PRICE, OF TORONTO, CANADA, ASSIGNOR OF ONE-HALF TO THOMAS B. MARSHALL, OF TORONTO, CANADA.

COVER FOR CENTRIFUGAL CLARIFIERS.

SPECIFICATION forming part of Letters Patent No. 720,479, dated February 10, 1903.

Application filed April 23, 1902. Serial No. 104,351. (No model.)

*To all whom it may concern:*

Be it known that I, WILLIAM W. PRICE, of the city of Toronto, in the county of York, Province of Ontario, Canada, have invented certain new and useful Improvements in Covers for Centrifugal Clarifiers, of which the following is a specification.

The ordinary centrifugal milk-clarifier is substantially similar to a centrifugal separator, with the exception that the covers which collect and discharge the separated cream and milk are changed to permit of the cream and milk again mixing before being discharged from the machine. In such covers the milk and cream are violently projected at short range against the inner surfaces of the cover, and the angle of incidence approaches very nearly to a right angle. The result is that a considerable percentage of the cream and milk is beaten up into foam and is thus wasted. Further, as the cream and milk only mix after striking the surfaces of the cover they do not again become so thoroughly intermingled as they are in the milk before it enters the separator. I overcome these difficulties by means of a cover in which the milk strikes the cover at a considerable distance from the milk-orifices and at a comparatively small angle and in which the path of the discharged cream intersects the path of the milk, so that they mingle before their velocity is destroyed by striking the cover, substantially as hereinafter more specifically described and then definitely claimed.

Figure 1:
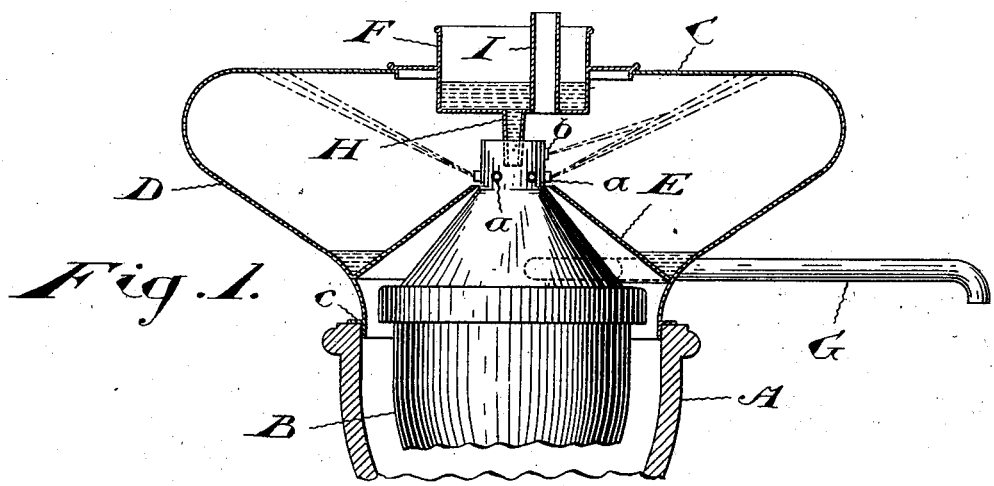
Figure 2:
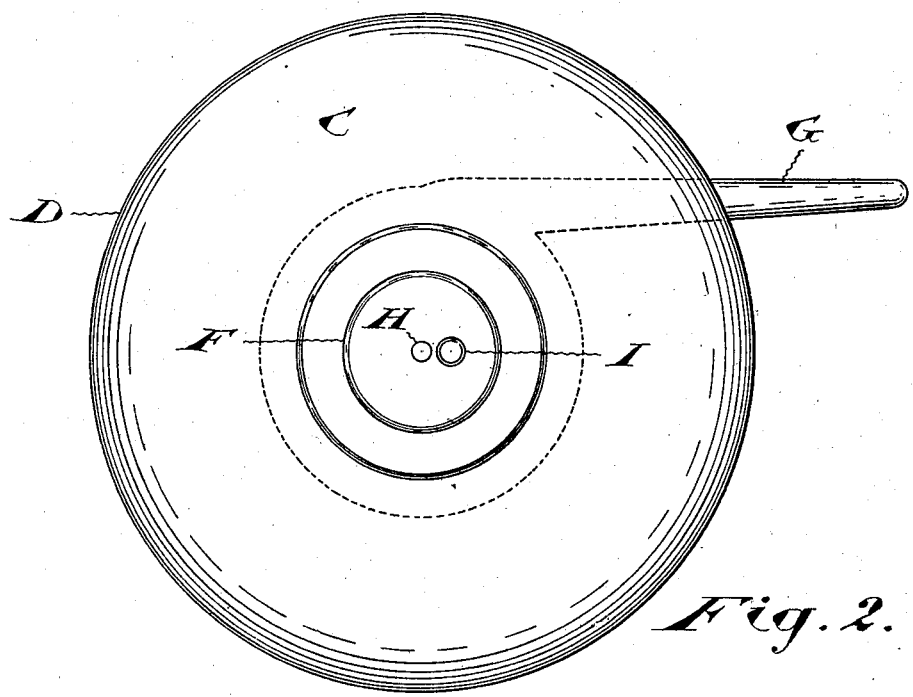

Figure 1 is a vertical section of my improved cover in position on a clarifier, part of the bowl of the clarifier being also shown in elevation. Fig. 2 is a plan view of the cover.

In the drawings like letters of reference indicate corresponding parts in the different figures.

In Fig. 1, A is the top of the clarifier, and B the bowl, provided with the usual milk-discharge orifices $a$ and cream-screw $b$. The cover comprises the top C, wall D, collector E, and milk-receptacle F. The top C is preferably of considerably greater diameter than the bowl B. It is also elevated above the cream and milk orifices, as shown. The wall D is shaped as an inverted cone and curves inwardly and upwardly to join the top C. Its lower portion is shaped to fit within the top of the clarifier A and is provided with a suitable rim or flange $c$ to rest on the top of the same. The collector E is also cone-shaped and extends from the lower portion of the wall D up to a point close beneath the milk-orifices. It thus forms, with the wall D, a receptacle for the clarified milk and discharges the same by means of the spout G. A central opening of considerable size is formed in the top C. The milk-receptacle F is shaped, as shown, to form a covering for this opening. Through the bottom of the milk-receptacle extends the tube H, adapted to conduct milk from the receptacle into the bowl B. Extending upwardly from the bottom of the milk-receptacle is an air-tube I, which supplies air to take the place of any driven out of the cover with the milk. Any suitable air filtering apparatus could be used with this tube as desired; but such, of course, forms no part of my invention.

As already stated, in ordinary covers the streams of milk and cream flowing from the discharge-orifices of the bowl B strike against certain surfaces of the cover at very close range and at comparatively large angles. The milk and cream passing through the discharge-orifices fly outwardly and somewhat upwardly, owing to the combined effect on the milk of the centrifugal motion and the upward motion due to the flow of milk through the apparatus. The cream being less in quantity and coming from the center of the bowl has less velocity outwardly and also comes out at an angle closer to the horizontal.

The under surface of the top of my cover forms a striking-surface for the milk, and this surface being extended outwardly and raised above the milk-orifices the streams of milk strike it at a comparatively small angle and at a considerable distance from the orifices.

The cover is preferably arranged so that the striking-surface is at a distance from the center greater than the radius of the bowl, as if the striking-surface is closer to the center than a distance equal to the radius of the bowl the stream of milk has still too great a velocity for my purpose. It is also an important feature that the striking-surface be sufficiently far from the center to permit of the stream of cream intersecting the stream of milk, so that the two become mingled and hit the striking-surface together. The cream and milk thus become much more intimately remixed than is possible when they are separately intercepted and mingled only when in a comparatively quiescent state. The curved connection between the wall and the top of the cover is also of considerable advantage, as the mingled milk and cream tend to fly downwardly in contact with this surface, and so to the bottom of the cover, the velocity being thus gradually checked without causing the milk and cream to be beaten into foam.

In practice the details of construction of this cover may be somewhat varied, the essential feature being that it shall retain the striking-surface at the distance from the discharge-orifices of the bowl already described.

I find that with the old covers the proportion of milk beaten into foam is on the average about two per cent. and that with my cover the proportion is about two-tenths of one per cent. As the foam is not commercially useful, my cover thus effects a large saving in establishments handling a considerable quantity of milk.

What I claim as my invention is—

1. The combination with a centrifugal clarifier-bowl having milk-orifices from which the milk issues outwardly and upwardly, of a cover having a substantially horizontal striking-surface located above the said apertures and extended outwardly so that milk issuing from the aforesaid apertures strikes the said surface at a distance from the center substantially greater than the radius of the said bowl, substantially as described.

2. The combination with a centrifugal clarifier-bowl having milk and cream orifices arranged to discharge the milk and cream in intersecting streams; of a cover having a striking-surface receiving the impact of the streams of milk and cream after they have intermingled, substantially as described.

3. The combination with a centrifugal clarifier and its bowl, of a cover connected with the clarifier and comprising a top of greater diameter than the bowl, and a wall sloping inwardly to its point of connection with the clarifier, substantially as described.

4. The combination with a centrifugal clarifier and its bowl, of a cover connected with the clarifier and comprising a top of greater diameter than the bowl, and a wall sloping inwardly to its point of connection with the clarifier and curved upwardly and inwardly to connect with the top, substantially as described.

5. A cover for a centrifugal clarifier comprising a top with a central opening therein, and having an inwardly and downwardly extending wall, a cover for the opening in the top, a milk-receptacle carried by the said cover, and a milk-feed tube extending downward from the bottom of the receptacle, substantially as described.

6. A cover for a centrifugal clarifier comprising a top with a central opening therein, and having an inwardly and downwardly extending wall, a cover for the opening in the top, a milk-receptacle carried by the said cover, a milk-feed tube extending downward from the bottom of the receptacle, and an air-tube extending up from the bottom of the said receptacle, substantially as described.

7. A cover for a centrifugal clarifier comprising a top of greater diameter than the bowl of the clarifier, said top having a wall sloping inwardly and connected with the clarifier, and a cone-shaped collector connected to the said inwardly-sloping wall and extending up to a point close beneath the discharge-orifices of the clarifier-bowl, substantially as described.

8. A cover for a centrifugal clarifier comprising a top having a wall sloping inwardly and connected with the clarifier and curved upwardly and inwardly to form the top, and a cone-shaped collector connected to said inwardly-sloping wall and extending up to a point close beneath the discharge-orifices of the clarifier-bowl, substantially as described.

9. A cover for a centrifugal clarifier comprising a top with a central opening therein, and having an inwardly and downwardly extending wall, a cover for the opening in the top, a milk-receptacle carried by the said cover, a milk-feed tube extending downward from the bottom of the receptacle, and a cone-shaped collector connected to the inwardly-sloping wall and extending up to a point close beneath the discharge-orifices of the clarifier-bowl, substantially as described.

10. A cover for a centrifugal clarifier comprising a top with a central opening therein, and having an inwardly and downwardly extending wall, a cover for the opening in the top, a milk-receptacle carried by the said cover, a milk-feed tube extending downward from the bottom of the receptacle, an air-tube extending up from the bottom of the said receptacle, and a cone-shaped collector connected to the inwardly-sloping wall and extending up to a point close beneath the discharge-orifices of the clarifier-bowl, substantially as described.

Toronto, April 9, 1902.

WM. W. PRICE.

In presence of—
A. J. COLBOURNE,
J. W. WEBSTER.